United States Patent [19]

Weaver

[11] Patent Number: 4,762,481

[45] Date of Patent: Aug. 9, 1988

[54] MOLD STRUCTURE FOR PRODUCING A WINDOW ASSEMBLY

[75] Inventor: William R. Weaver, Toledo, Ohio

[73] Assignee: Libbey-Owens-Ford Co., Toledo, Ohio

[21] Appl. No.: 937,703

[22] Filed: Dec. 4, 1986

Related U.S. Application Data

[62] Division of Ser. No. 794,019, Nov. 1, 1985, Pat. No. 4,662,113.

[51] Int. Cl.$^4$ .................. B29C 45/14; B29C 45/26
[52] U.S. Cl. ..................................... 425/116; 425/127
[58] Field of Search ............. 425/110, 116, 117, 121, 425/127, 129 R, 343, 500; 249/83, 85, 95

[56] References Cited

U.S. PATENT DOCUMENTS

| 666,295 | 1/1901 | Wheeler | 264/259 |
|---|---|---|---|
| 2,137,472 | 11/1938 | Forbes | 425/116 |
| 3,759,004 | 9/1973 | Kent | 52/400 |
| 4,072,340 | 2/1978 | Morgan | 52/208 |
| 4,089,134 | 5/1978 | Kolke | 49/227 |
| 4,240,227 | 12/1980 | Hasler et al. | 49/348 |
| 4,336,009 | 6/1982 | Wolf | 249/83 |
| 4,364,595 | 12/1982 | Morgan et al. | 52/208 |
| 4,454,688 | 6/1984 | Rest et al. | 49/502 |
| 4,457,109 | 7/1984 | Royse | 49/348 |
| 4,457,111 | 7/1984 | Kolke | 49/502 |
| 4,494,337 | 1/1985 | Watanabe et al. | 49/428 |
| 4,584,155 | 4/1986 | Zanella | 425/127 |
| 4,626,185 | 12/1986 | Monnet | 425/116 |

FOREIGN PATENT DOCUMENTS 913379 12/1962 United Kingdom ............... 264/261

Primary Examiner—Willard E. Hoag
Attorney, Agent, or Firm—Marshall & Melhorn

[57] ABSTRACT

A mold for forming a window assembly which includes a transparent glass sheet and gaskets formed by curing a polymeric gasket material in situ on the glass sheet to encapsulate a marginal peripheral edge portion thereof. A glass sheet to be utilized in a vehicle door has a front edge, rear edge and a lower edge to each of which is adhered such a gasket. In addition, a bracket means for attachment to a scissor linkage for raising and lowering the window can be secured to the lower edge of the window. The gaskets are formed in the mold with the transparent sheet and bracket means, typically by a reaction injection molding process. Each of the front and rear gaskets may have a flange portion thereon for insertion in an opening in a gasket attached to a frame of the window opening in the vehicle door.

3 Claims, 3 Drawing Sheets

MOLD STRUCTURE FOR PRODUCING A WINDOW ASSEMBLY

This is a division of application Ser. No. 794,019 filed Nov. 1, 1985, now U.S. Pat. No. 4,662,113.

BACKGROUND OF THE INVENTION

The present invention relates generally to a window assembly and to a process for producing the assembly, and more particularly to a door glass assembly for a vehicle including a glass sheet having a gasket formed along at least one edge thereof and a bracket attached along at least one other edge thereof.

Initially, fixed window assemblies for vehicles were comprised of a plurality of elements including adhesive sealants applied around the marginal edges of the glass sheet, suitable mechanical fasteners such as metal clips, and exterior decorative trim strips disposed to cover the junction between the marginal edges of the glass sheet and the adjacent portions of the vehicle frame. Such window structures were costly, especially from a labor standpoint, since it was necessary to assemble the individual elements along the vehicle assembly line.

Subsequently, in an endeavor to improve the above window structure, unitary window assemblies of the type illustrated in U.S. Pat. No. 4,072,340 were developed. These assemblies included a sheet of glass, an adjacent frame, and a casing or gasket of molded material, such as polyvinylchloride, extending between the frame and the peripheral edge of the window to hold the sheet of glass and the frame together. Fasteners were provided at spaced locations along the frame such that the entire assembly could be guided into location over the opening in a vehicle body as a unit. Other types of unitary window assemblies are disclosed in U.S. Pat. Nos. 3,759,004 and 4,364,595. While such unitary window structures greatly reduce the time required to mount the window assembly in the associated vehicle, such structures are relatively costly, since the individual components required to produce each window assembly generally must be manually assembled.

Moveable vehicle windows also presented problems, especially as the window glass became curved. Seals were typically attached to the door frames on either side of the channel in which the window traveled. In a hard top or convertible, a seal was typically attached to the leading edge of the rear window to engage the trailing edge of the door glass. Such window structures were costly to assemble and made it difficult to eliminate wind noise and leaking.

U.S. Pat. No. 4,098,134 discloses a mechanism for moving a curved window glass in a door of a vehicle along a curved path. A bottom edge of the window glass is securely attached in a channel of a channel member which in turn is secured to a window lifting mechanism inside the door of the vehicle. The window glass is guided by glass-runs of conventional structure comprising an elastic member of, for example, rubber covered at opposite ends thereof with a steel sheet.

U.S. Pat. No. 4,240,227 discloses a window assembly for a front door of an automobile including a glass pane attached to a guide member or shoe either by adhesive or by screws passing through holes previously provided in the glass pane. The window is moved in a window frame having a pair of generally parallel rails formed as channels opening toward the window pane. The window pane is provided with guide shoes or like members received in and guided on the respective channels and affixed to the pane inwardly of respective edges thereof so that these edges can be engaged, even along the face of the pane provided with the shoes or guide members, by seals on the frame or vehicle body.

U.S. Pat. No. 4,454,688 discloses a window guide and seal for a lowerable window in a motor vehicle in which the plane of the window is in alignment with the external surface of the body work. The window is firmly connected only at its lateral vertical edges with guideways and its upper inclined and horizontal edge interacts with a sealing strip fixed in the frame opening.

U.S. Pat. No. 4,457,109 discloses a flush glass window assembly for an automotive vehicle body which includes a window frame formed in the vehicle body having side and top seals, and a vertically moveable window glass adapted to be raised and lowered in the window frame opening. During its entire path of movement, the inner surface of each side edge of the glass is spaced outwardly from the respective side seals. As the glass approaches its full raised position it moves inwardly toward the interior of the vehicle into contact with the respective seals.

U.S. Pat. No. 4,457,111 discloses a sealing structure for a moveable window which allows a moveable window pane to lie flush with the outside of the window sill frame. The vertical edges of the window pane are provided with projecting guides which have a runner line somewhat offset from the plane of the rest of the pane. The guide runners are supported by elastic seals such that the pane lies flush with the outside surface of the window sill frame.

U.S. Pat. No. 4,494,337 discloses a motor vehicle side window assembly in which the door glass weather strip is provided on the door frame in such a manner that it contacts the interior surface of the door glass. A slide piece is attached to the edge of the door glass and engages a guide in the door frame to guide the door glass in a vertical direction. The outer surface of the door glass is substantially flush with the outer surface of the door frame.

All of these window assemblies are relatively costly since the individual components required to produce each window assembly are numerous and generally must be manually assembled.

SUMMARY OF THE INVENTION

The present invention relates to a window assembly and a method of making the same including a mold structure for forming a gasket around a predetermined portion of a sheet of generally transparent frangible material, such as glass, to produce a unitary window assembly. In the preferred embodiment of the invention, the gasket is formed by curing a multi-constituent polymeric gasket forming material in situ on the glass sheet to encapsulate the marginal peripheral edge portion of the sheet. The gasket is typically formed by a reaction injection molding process.

More specifically, the mold structure includes at least two cooperating mold sections each having a recessed portion formed therein in facing relationship to one another. The recessed portions cooperate to define a sheet receiving chamber for receiving a sheet of transparent material such as glass. A compressible seal means is positioned about at least a portion of the periphery of the chamber and functions to resiliently support the glass sheet within the chamber. In the preferred embodiment of the invention, each mold section includes a metallic main body portion, and the seal means maintains the glass sheet in spaced-apart relationship with the main body portions of the mold sections to prevent any glass-to-metal contact between the glass sheet and the metallic mold sections.

Also, the seal means cooperates with predetermined portions of the glass sheet and the mold sections for defining a gasket cavity having a configuration corresponding to the gasket to be formed on the glass sheet. In accordance with the present invention, the facing surfaces of mold sections disposed outwardly of the gasket forming cavity are in metal-to-metal contact with one another. This enables the amount the seal means is compressed and the dimensions of the gasket to be precisely controlled. Inlet means or gates are provided for introducing a flowable gasket forming material into the gasket cavity.

The window assembly also includes a metal bracket for connection to a scissor linkage for raising and lowering the window assembly in a vehicle door. The bracket is attached to the window glass by a gasket formed at the same time and in the same manner as the encapsulating gaskets on the window.

BRIEF DESCRIPTION OF THE DRAWINGS

The above, as well as other advantages of the present invention, will become readily apparent to those skilled in the art from the following detailed description of a preferred embodiment when considered in the light of the accompanying drawings, in which.

DESCRIPTION OF THE PREFERRED EMBODIMENT

Figure 1:
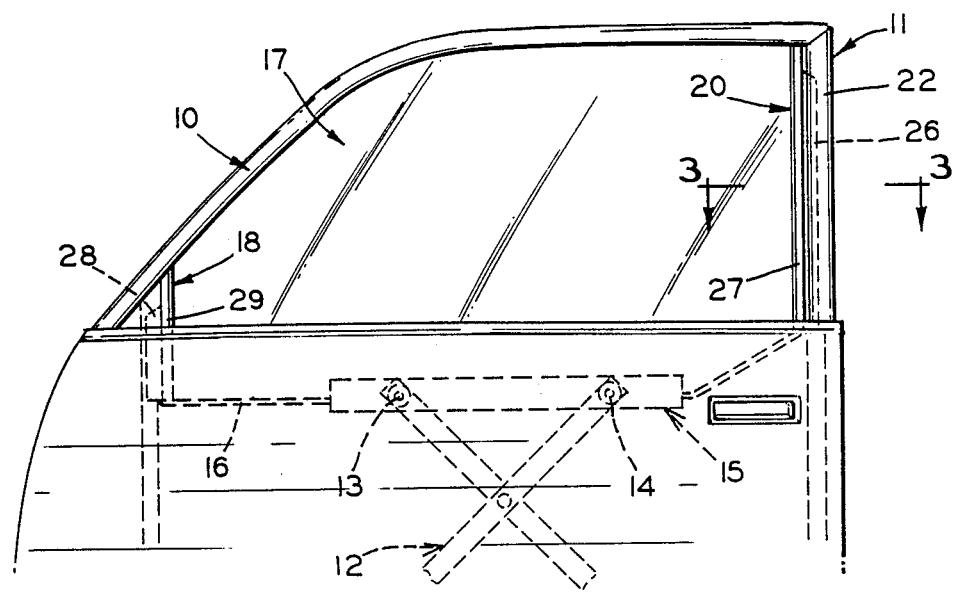
FIG. 1 is a front elevational view of a window assembly according to the present invention mounted in a vehicle door.

There is shown in FIG. 1 a window assembly 10 according to the present invention installed in a front door 11 of a vehicle (not shown). A scissor linkage 12 is provided in the door 11 to raise and lower the window assembly 10. The linkage 12 may be of any conventional type and is shown in the raised position. The linkage 12 is pivotally connected at 13 and 14 to a bracket 15 attached to a lower edge 16 of a window 17 in the window assembly 10.

Figure 2:
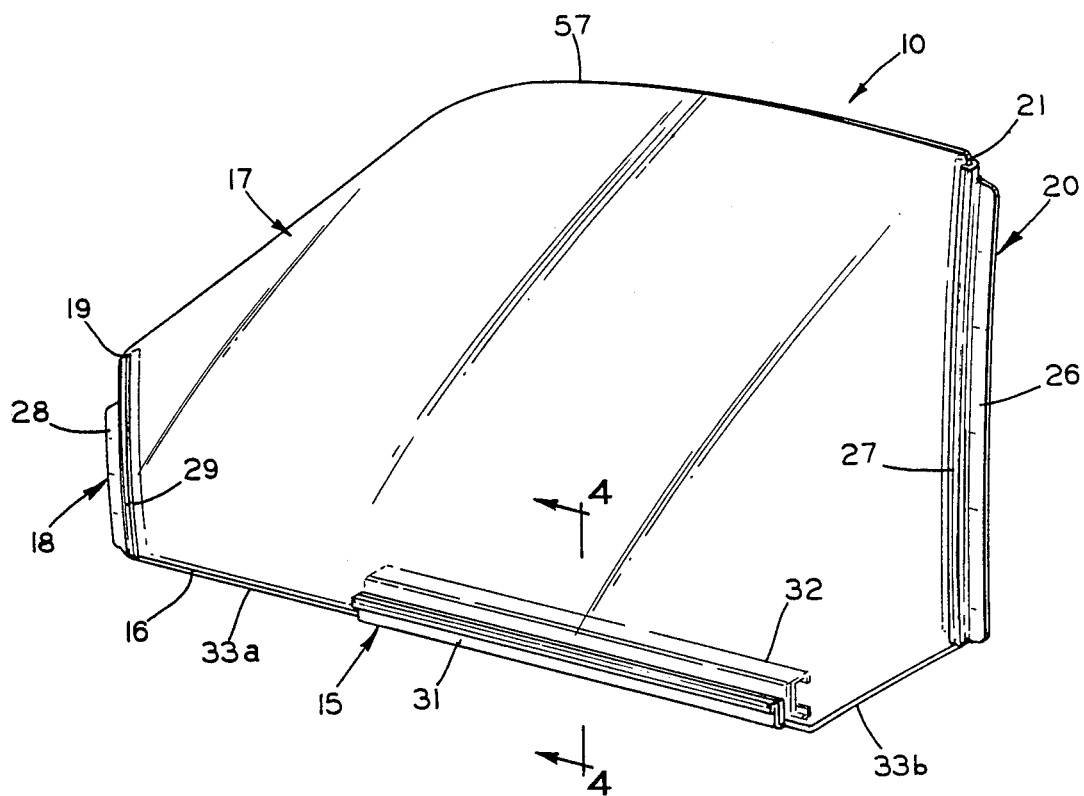
FIG. 2 is a perspective view of the window assembly shown in FIG. 1.
Figure 3:
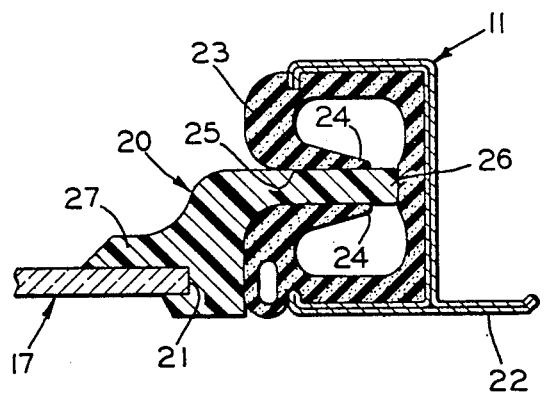
FIG. 3 is an enlarged fragmentary sectional view of the door frame and window assembly of FIG. 1 taken along the line 3—3 thereof.

Referring to FIGS. 1 and 2, a front gasket 18 is attached to a front edge 19 of the window 17 and a rear gasket 20 is attached to a rear edge 21 of the window 17. As shown in more detail in FIG. 3, the front door 11 of the vehicle includes a window frame having a rear section 22. The window frame rear section 22 is formed in the shape of a "J" in cross section with the top of the "J" facing the outside of the front door 11. One half of the top and the body of the "J" are curved at the edges thereof to retain a gasket 23. The gasket 23 is generally "C" shaped in cross section with the ends 24 defining an opening and being turned toward the center of the "C" to form a slotted opening 25.

The gasket 23 extends the entire length of the frame rear section 22 and the slot 25 accepts a flange member 26 formed on the gasket 20 as the window is raised and lowered. The ends 24 of the gasket 23 are typically relatively flexible and tend to snuggly press against the sides of the flange member 26 to seal against the intrusion of fluids such as wind and rain. The flange member 26 extends from a body portion 27 of the gasket 20. The body portion 27 encloses the rear edge 21 of the window 17 and is attached thereto for movement with the window as the linkage 12 raises and lowers the window assembly 10. The front gasket 18 is of similar construction with a flange member 28 and a body portion 29. The flange member 28 is accepted by a gasket (not shown) in a front section of the window frame.

Figure 4:
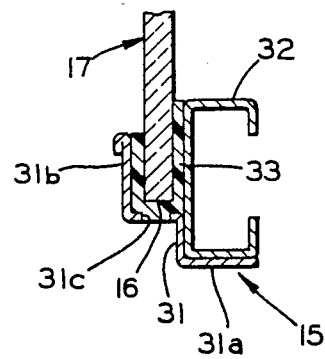
FIG. 4 is an enlarged fragmentary sectional view of the window assembly of FIG. 2 taken along the line 4—4 thereof.
Figure 6:
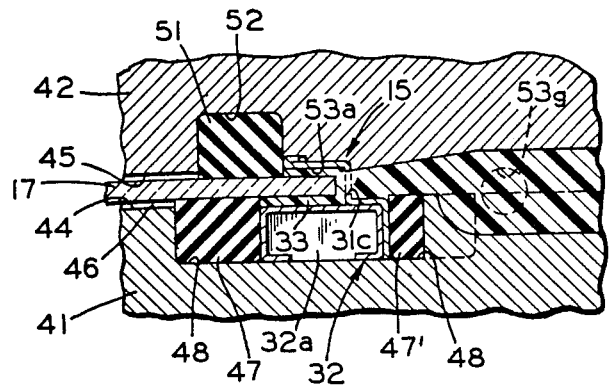
FIG. 6 is an enlarged fragmentary sectional view of the window assembly and mold structure of FIG. 5 taken along the line 6—6 thereof.

There is shown in FIG. 4 a fragmentary sectional view of the bracket 15 and the window 17. The bracket 15 includes an angled elongate plate member 31 having a lower L-shaped portion 31a which is secured to the lower end of a C-shaped channel member 32 by welding, for example. The channel member 32 is formed to accept rollers (not shown) attached at the pivot points 13 and 14 to the linkage 12 to permit raising and lowering of the window assembly 10. The angled plate member includes an upper L-shaped portion 31b which cooperates with the side wall of the channel member 32 to define an upwardly facing channel for receiving the lower peripheral edge 16 of the window 17. The lower edge 16 is secured relative to the bracket 15 by a U-shaped gasket 33. The lower leg of the upper L-shaped portion 31b is provided with an aperture 31c which, as shown in FIG. 6, is utilized to introduce a suitable flowable gasket forming material into the associated gasket forming cavities. As will be discussed, the gaskets 18, 20 and 33 are all simultaneously molded in situ to the window 17 and the bracket 15.

Referring to FIGS. 5 through 8, there is shown a mold 40 for making a window assembly in accordance with the present invention. The mold 40 is formed of a lower section 41 and an upper section 42 (half of which has been cut away along a center line 43 for illustration purposes). While the mold sections 41 and 42 are typically formed of a metallic material such as steel or aluminum, for example, other types of substantially rigid or non-resilient material can be used. Suitable means, not shown, are provided to open and close the mold sections 41 and 42. Also, each of the mold sections 41 and 42 can be provided with passageways (not shown) for circulating a suitable coolant through the respective mold sections.

Figure 7:
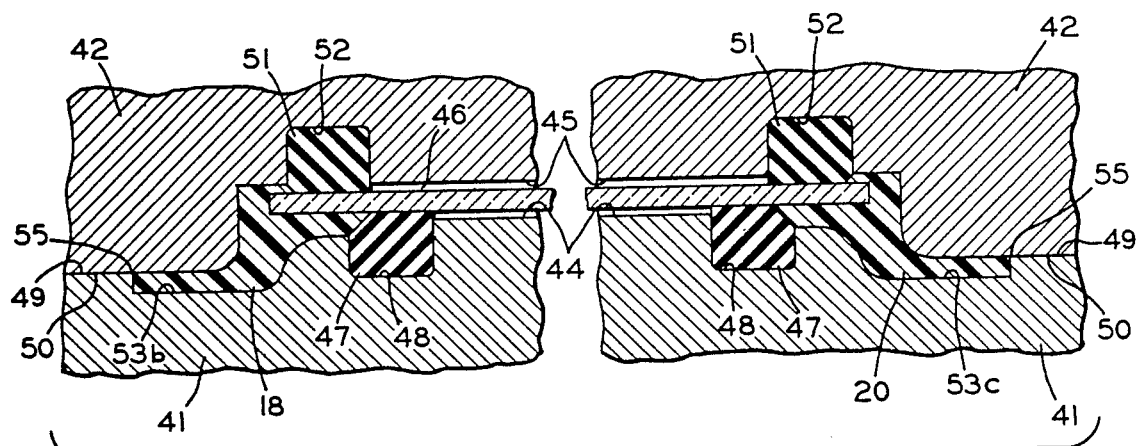
FIG. 7 is an enlarged fragmentary sectional view of the window assembly and mold structure of FIG. 5 taken along the line 7—7 thereof.
Figure 8:
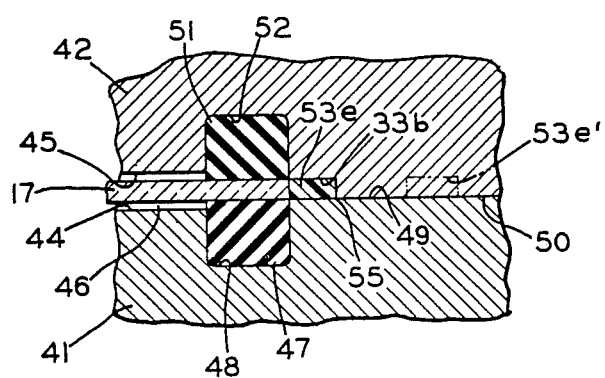
FIG. 8 is an enlarged fragmentary sectional view of the window assembly and mold structure of FIG. 5 taken along the line 8—8 thereof.

As shown in FIGS. 6 through 8, the mold sections 41 and 42 are provided with recessed portions 44 and 45 respectively in facing relationship to one another such that, when the mold sections are closed, the recessed portions 44 and 45 cooperate to define a sheet receiving or glass clearance chamber 46 for receiving the glass sheet 17 on which a gasket is to be formed. When the mold sections are open, the glass sheet 17 is positioned on the lower section 41 so that the outer peripheral portion of the lower surface of the glass rests on a resilient lower seal 47 positioned within a groove 48 formed in the upper surface of the lower section 41. Also positioned within the groove 48 and spaced from the seal 47 is a seal 47'.

After the glass sheet 17 is suitably support on the seal 47 and the bracket 15 held spaced from the edge of the sheet by means of the seals 47 and 47', the upper mold section 42 is lowered into position to enable the outer peripheral portions of the facing surfaces 49 and 50 of the cooperating mold sections 41 and 42 respectively to be clamped together in a metal-to-metal contact, as shown in FIGS. 7 and 8. The upper mold section 42 carries a resilient upper seal 51 positioned in a groove 52 formed opposite the groove 48. The upper seal 51 cooperates with the lower seal 47 to press yieldingly against the glass sheet 17 and resiliently support the glass sheet within the glass clearance chamber 46.

The chamber 46 of the mold 40 is slightly larger than the formed glass sheet 17 to avoid any glass-to-metal contact between the glass sheet 17 and the metallic mold sections 41 and 42. However, it will be appreciated that the glass clearance chamber 46 can be formed of any shape as long as the chamber is sufficiently large to avoid any glass-to-metal contact between the glass sheet and the metallic mold sections. For example, the portions of the mold sections 41 and 42 which are below and above the central portions of the glass sheet 17 can be removed such that each mold section will be generally ring-shaped.

The seals 47, 47' and 51 are preferably formed of a silicone rubber material and can be secured within the respective grooves 48 and 52 by means of a suitable adhesive. Alternatively, the seals 47, 47' and 51 can be releasably secured within the respective grooves. This can be accomplished by providing tab portions (not shown) in spaced apart locations around the respective seal which can be inserted and releasably held within corresponding tab receiving apertures (not shown) formed at corresponding spaced apart locations around the respective groove.

Figure 5:
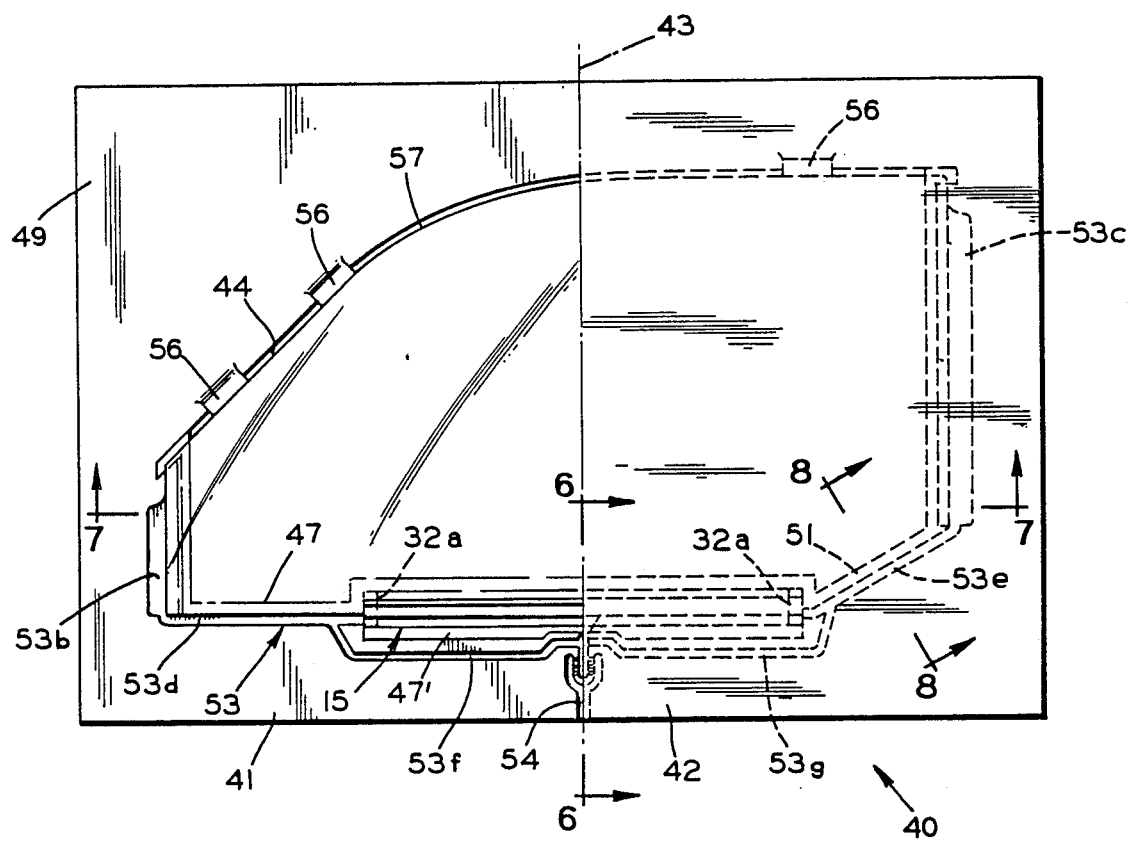
FIG. 5 is a top plan view of a mold structure for fabricating the window assembly according to the present invention with a portion of the upper half of the mold cut away.

In addition to resiliently supporting the glass sheet 17 within the glass clearance chamber 46, the seals 47 and 51 cooperate with selected portions of glass sheet 17, the bracket 15, and the mold sections 41 and 42 for defining the gasket forming cavities, generally designated 53, utilized to form the gaskets 18, 20 and 33. More specifically, these gasket forming cavities include a lower cavity 53a (see FIG. 6) for forming the lower edge gasket 33, a front cavity 53b (see FIG. 7) for forming the front gasket 18, and a rear cavity 53c (see FIG. 7) for forming the rear gasket 20. The front cavity 53b can be connected to the lower cavity 53a by a passageway 53d, while the rear cavity 53c can be connected to the lower cavity 53a by a passageway 53e. As shown in FIGS. 5 and 8, the passageways 53d and 53e are located adjacent the peripheral edge of the glass sheet. Such a construction causes rib portion 33a and 33b (shown in FIG. 2) to be formed along the lower edge 16 of the sheet. The rib portions 33a and 33b connect the lower gasket 33 to the front and rear gaskets 18 and 20. Alternatively, the rib portions 33a and 33b could be eliminated by forming the passageway 53d and 53e in spaced relationship with the lower edge 16, as represented in phantom in FIG. 8 at 53e.

The cavities communicate with an inlet means or gate 54 for receiving a flowable polymeric gasket forming material from a nozzle member (not shown). The gasket forming material is introduced into the lower cavity 53a through the aperture 31c. As shown in FIG. 5, the gasket forming material is supplied to the front cavity 53b via the cavity 53a and the passageway 53d, and is supplied to the rear cavity 53c via the cavity 53a and the passageway 53e. To prevent the undesirable ingress of gasket forming material into the channel member 32 as it flows through the cavity 53a into the passageways 53d and 53e, the opposite ends of the channel member 32 are preferably closed off or sealed with removable plugs 32a. Auxiliary passageways 53f and 53g can be provided for supplying the gasket forming material directly from the inlet 54 to the passageways 53d and 53e respectively. Typically, the gasket forming material is adapted to polymerize and cure in situ on the peripheral portion of the glass sheet 17. The gasket can be formed by a reaction injection molding process utilizing a polyurethane material, for example. Materials which have been utilized to form suitable gaskets include Bayflex 110-80 and Bayflex 110-50 manufactured by Mobay Chemical Corporation of Pittsburgh, Pa. For a further description of procedures, compositions component preparation and post treatments reference is made to my copending application Ser. No. 535,870, filed on Sept. 26, 1983, the disclosure of which is hereby incorporated herein by reference.

As shown in FIGS. 7 and 8, the mold sections 41 and 42 include facing surfaces 49 and 50, respectively, which are in contact with one another outwardly of the gasket forming cavity 53 to define a parting line 55. Since the glass sheet 17 is relatively fragile, it is important to control the amount the seals 47 and 51 are compressed to avoid fracturing the glass. By enabling the two mold sections to come together in metal-to-metal contact, the amount the seals 47 and 51 are compressed can be controlled. Also, the metal-to-metal contact of the mold sections 41 and 42 enables the width of the gasket forming cavity 53 to be precisely controlled. A number of tabs 56 are spaced about the recessed portions 44 and 45 of the mold to engage an upper edge 57 of the window 17 for positioning the window 17 precisely with respect to the gasket forming cavity 53.

In accordance with the provisions of the patent statutes, the principle and mode of operation of the present invention have been described in what is considered to represent the preferred embodiment. However, it should be understood that the invention may be practiced otherwise than as specifically illustrated and described without parting from its spirit or scope.

What is claimed is:

1. A mold structure for producing a window assembly including a transparent sheet having a bracket secured thereto by a first gasket member adhered to the bracket and a first peripheral portion of the sheet and having a second gasket member adhered to a second peripheral portion of the sheet, said mold structure comprising;

at least two cooperating mold sections having facing surfaces defining bracket and sheet receiving chambers;

at least one of the facing surfaces of said mold sections defining a first mold cavity adjoining said chambers for forming a first gasket and a second mold cavity spaced from said first cavity along an edge of the sheet and adjoining the sheet receiving chamber for forming a second gasket spaced from said first gasket, said first and second gaskets being formed about the edge of the sheet;

spaced seal means for holding the bracket spaced from an edge of said sheet; and inlet means for introducing a flowable gasket forming material into the first and second gasket forming cavities when said mold sections are in contacting relationship.

2. The mold structure according to claim 1 including a passageway formed in said mold sections for connecting the first gasket forming cavity to the second gasket forming cavity.

3. The mold structure according to claim 2 wherein said passageway is formed by the cooperation of said mold sections and a predetermined peripheral portion of the sheet.

* * * * *